May 29, 1923.

M. M. MOFFITT

TRAP

Filed Sept. 14, 1921     2 Sheets-Sheet 2

1,456,676

Inventor
M. M. Moffitt
By Mason, Fenwick & Lawrence
Attorneys

Patented May 29, 1923.

1,456,676

UNITED STATES PATENT OFFICE.

MANSFIELD MARTIN MOFFITT, OF SAN ANTONIO, TEXAS.

TRAP.

Application filed September 14, 1921. Serial No. 500,524.

*To all whom it may concern:*

Be it known that I, MANSFIELD MARTIN MOFFITT, a citizen of the United States, residing at San Antonio, in the county of Bexar and State of Texas, have invented certain new and useful Improvements in Traps; and I do hereby declare the following to be a full, clear, and exact description of the invention, such as will enable others skilled in the art to which it appertains to make and use the same.

This invention relates to new and useful improvements in traps and what is more particularly known as fish and game trap, the main object of the present invention being the provision of a trap of the above character wherein fish or game can be readily entrapped, the construction of the device being such as to permit the same to be manufactured for various sizes of fish or game, the construction of the device being made to adapt the same for the purpose desired.

Another object of the invention is the provision of a trap having a plurality of resilient arms adapted to be moved outwardly away from each other to a set position and provided with means for retaining the arms in this position, said means being operated through the medium of a trigger to which bait is attached whereby pulling movement on the part of the trigger will release the retaining means and permit the arms to move inwardly toward each other engaging the object tampering with the bait.

With the above and other objects in view the invention consists in the novel features of construction, combination and arrangement of parts hereinafter more fully set forth, pointed out in the claim and shown in the accompanying drawings, in which:

Figure 1:
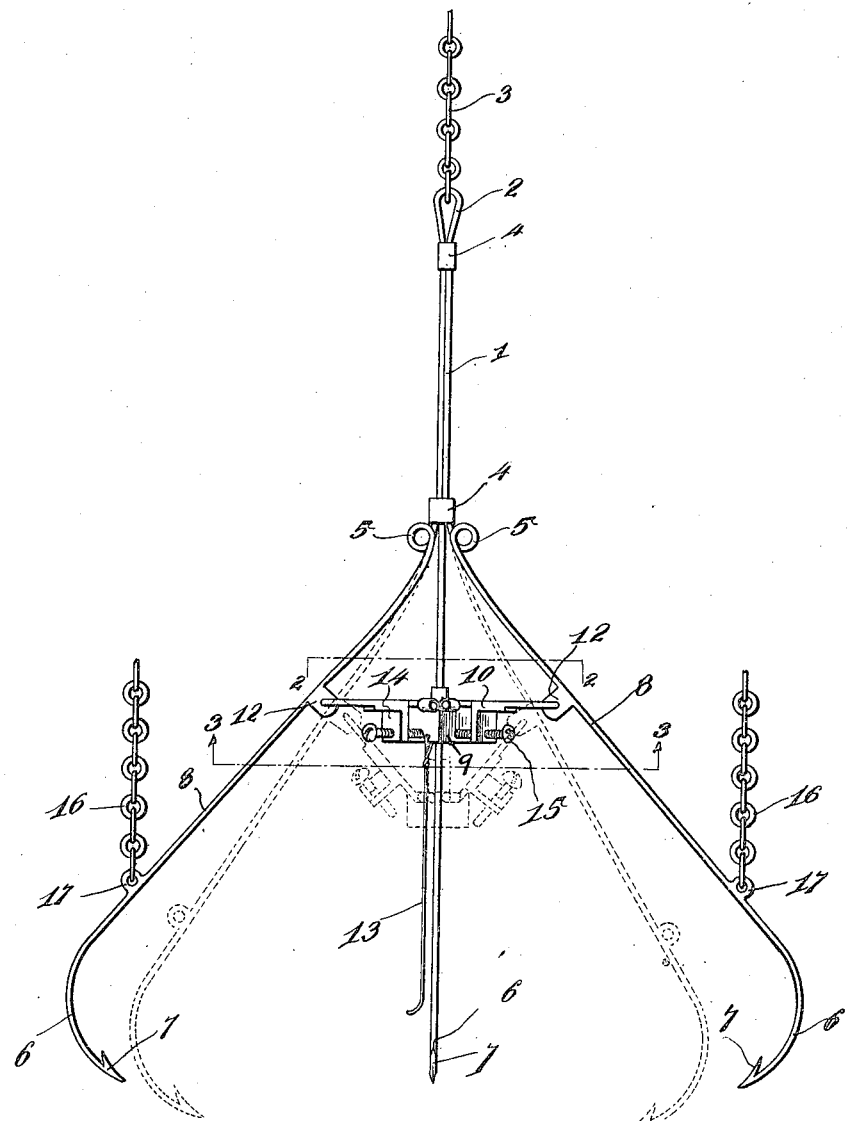
Figure 1 is a side elevation of my improved trap showing the same in a set position in full lines and in a partially sprung position in dotted lines.
Figure 2:
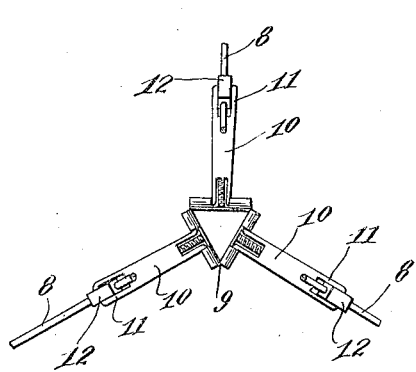
Fig. 2 is a transverse sectional view taken on the line 2—2 of Fig. 1.
Figure 3:
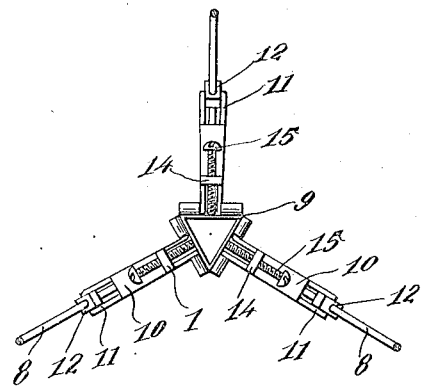
Fig. 3 is a transverse sectional view taken on the line 3—3 of Fig. 1.
Figure 4:
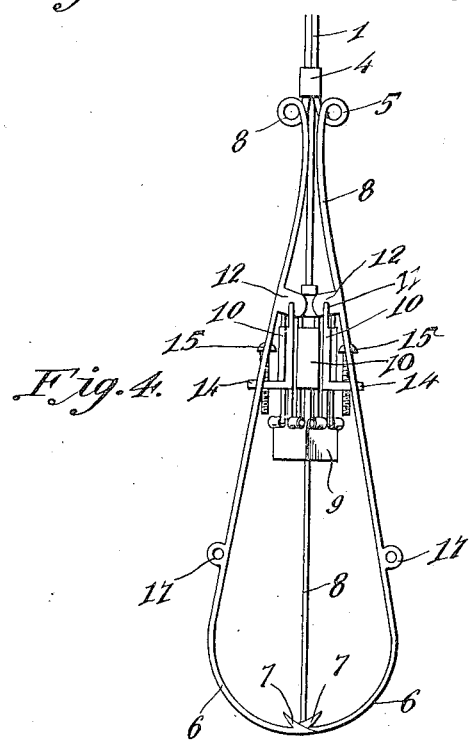
Fig. 4 is a side elevation of the trap in its normal position.

In the construction of my improved trap, I provide a stem portion generally indicated by the numeral 1 having a loop 2 formed at the outer end thereof, to which a chain 3 or any other supporting means for the trap may be attached for anchoring the trap. The stem in the present instance, is formed by doubling a strip of wire upon itself, the intermediate portion of the strip forming the loop 2, while the two strands are held in parallel relation by means of the bands 4 arranged in spaced relation upon the strands. The ends of the strands are then looped as at 5 to form a spring portion, while the extreme ends extend downwardly in divergent relation and are provided with a curved portion 6 having spurs 7 formed thereon to provide engaging hooks. A third strand of wire is arranged parallel with the stem 1 and retained in position by means of the bands 4, this third strand being looped to form a spring portion the same as the spring loops 5. The end of this wire extends downwardly and is provided with a hook or loop portion 6 having a spur 7 formed thereon to correspond with the hook members on the other strands.

In order to retain the hook portions of the trap in a set position as shown in Fig. 1, suitable means are disposed between the hook members, said means including an elongated triangular body member 9 and links 10 hingedly connected thereto and to the hook arms 8. The links at their outer ends are tined or bifurcated as at 11, the ends of the tines being bent to enter the opening in the perforated ear 12 secured to the arms 8. The other ends of the links 10 are also shown as bifurcated and are suitably hinged to the block 9. Depending from the body member 9 is the bait hook 13 to which bait may be attached.

In order to retain the hook arms 8 in outward position as shown in Fig. 1, means are provided for holding the body 9 in position above a plane passing through the ears 12. Said holding means preferably take the form of angular extensions or projections 14 extending laterally from the links 10, said projections being adapted for abutment against the peripheral walls of the body 9. In order to provide for different degrees of force necessary to pull the body 9 down below said plane passing through the ears 12, said projections 14 are made adjustable by passing screws 15 therethrough, said screws being moved longitudinally of the links 10. The screws may be adjusted to obtain the desired degree of angularity between the links 10 and the body 9. It will now be seen that the trigger, which includes the body 9, can be set at different degrees of stiffness or resistance to downward movement. For convenience in setting the trap I may attach lifting means such as chain 16 to lug 17 on the backs of the hook arms 8.

From the above description, taken in connection with the accompanying drawings, it will be readily apparent that I have provided a suitable fish and game trap whereby the strands which comprise the arms and hook portions of the trap may be formed of any suitable weight of material in accordance with the animal or fish to be trapped and wherein the trigger portion or the means for retaining the arms in a set position can be adjusted in accordance with the type of animal or fish to be entrapped, that is, so arranged whereby either a light or heavy pull will be required to release the hook arms 8. The device in itself is very simple in construction, can be manufactured and placed upon the market at a comparatively small cost and is positive and effective in its operation.

I claim:

A trap of the class described including a stem, spring hook arms extending at an angle from said stem, an elongated body member arranged between said arms, links hingedly connected to one end of the body and to said arms, a bait member depending from said body, and adjusting screws carried by the links for engagement with the peripheral face of said body whereby to regulate the amount of downward pull to be exerted on the trigger to release the arms to their closed position.

In testimony whereof I affix my signature.

M. MARTIN MOFFITT.